(12) United States Patent
Klinkowstein

(10) Patent No.: US 6,927,985 B2
(45) Date of Patent: Aug. 9, 2005

(54) HIGH VOLTAGE GENERATOR

(75) Inventor: Robert E. Klinkowstein, Winchester, MA (US)

(73) Assignee: Newton Scientific, Inc., Cambridge, MA (US)

( * ) Notice: Subject to any disclaimer, the term of this patent is extended or adjusted under 35 U.S.C. 154(b) by 0 days.

(21) Appl. No.: 10/197,218

(22) Filed: Jul. 17, 2002

(65) Prior Publication Data

US 2003/0058659 A1 Mar. 27, 2003

Related U.S. Application Data

(60) Provisional application No. 60/306,117, filed on Jul. 17, 2001.

(51) Int. Cl.[7] .......................................... H02M 3/335
(52) U.S. Cl. ...................................... 363/17; 363/61
(58) Field of Search ......................... 363/17, 61, 65, 363/71

(56) References Cited

U.S. PATENT DOCUMENTS

| | | | | |
|---|---|---|---|---|
| 3,465,231 A | * | 9/1969 | Hyde | |
| 3,579,078 A | * | 5/1971 | Cronin | |
| 4,298,926 A | * | 11/1981 | Black | 363/61 |
| 4,686,615 A | * | 8/1987 | Ferguson | 363/17 |
| 4,737,974 A | * | 4/1988 | Hino et al. | 363/17 |
| 4,893,227 A | * | 1/1990 | Gallios et al. | 363/61 |
| 5,555,494 A | * | 9/1996 | Morris | 363/17 |
| 5,774,345 A | * | 6/1998 | Yoshida et al. | 363/17 |
| 5,963,436 A | * | 10/1999 | Yoshida | 363/17 |
| 6,154,382 A | * | 11/2000 | Kawahara et al. | 363/61 |
| 6,563,717 B2 | * | 5/2003 | Lunding et al. | 363/65 |

OTHER PUBLICATIONS

E. Everhart & P. Lorrain, "The Cockcroft–Walton Voltage Multiplying Circuit," Review of Scientific Instruments vol. 24, No. 3, Mar. 1953.

G. Reinhold & K. Truempy, "Future High Voltage DC Power Supplies of the Shielded Design," IEEE Transactions of Nuclear Science, Jun. 1967.

G. Reinhold, "Pressurized 1–MeV Electron Accelerator of the Twin–Tank Design for Electron Microscopy," IEEE Transactions of Nuclear Science, Jun. 1969.

G. Reinhold et al., "60 kW Electron Accelerator for a Paint–Curing Facility," IEEE Transactions of Nuclear Science, Jun. 1973.

G. Reinhold & R. Gleyvod, "Twin–Tank For High–Voltage Electron Microscopy (HVEM)," IEEE Transactions of Nuclear Science, Jun. 1973.

* cited by examiner

Primary Examiner—Jeffrey Sterrett
(74) Attorney, Agent, or Firm—Gauthier & Connors, LLP

(57) ABSTRACT

A high voltage power supply includes a current source that provides a continuous current signal, and a switching circuit that includes a plurality of switching elements. The switching circuit is responsive to the continuous current signal, and provides an alternating current signal. The power supply also includes a multiplier-rectifier circuit with at least one loading inductor, and having an input responsive to said alternating current signal to provide a rectified output signal. The switching circuit may be configured and arranged as an H-bridge circuit. The input of the multiplier-rectifier circuit is short circuited every half cycle of the alternating current signal during the transition from positive to negative current flow (or visa-versa).

27 Claims, 14 Drawing Sheets

| COMPONENT | VALUE |
|---|---|
| $C_C$ | 100–10000 pfd |
| $C_S$ | 0.1–100 pfd |
| $L_T$ | 10–10000 mHy |
| $C_{DC}$ | 100–10000 pfd |
| $L_1$ | 1–100 uHy |
| $C_1$ | 0.1–10 ufd |
| $R_1$ | 0.1–∞ ohms |
| $L_2$ | 0.1–10 mHy |
| $V_1$ | 1–1000 volts |

*FIG. 12*

HIGH VOLTAGE GENERATOR

CROSS REFERENCE TO RELATED APPLICATIONS

This application claims priority from the provisional application designated Ser. No. 60/306,117 filed Jul. 17, 2001 entitled "High Voltage Generator". This application is hereby incorporated by reference.

BACKGROUND OF THE INVENTION

The present invention relates to a power supplies, and in particular to high voltage power supplies.

High voltage generator circuits are used to provide power for a variety of applications that rely on the acceleration of charged particles. For example, high voltage generators are used in ion implanter systems for the manufacture of semiconductors, electron beam irradiation systems, x-ray generators, isotope production systems for medicine, research and industry, neutron production systems, accelerator mass spectrometers, research accelerators, and other applications. These applications require the use of high voltage power supplies capable of generating voltages ranging from several kilovolts to a few megavolts, and power levels of several watts to many tens of kilowatts.

High voltage generator circuits often include a high voltage multiplier-rectifier circuit, an AC drive circuit, and a transformer interface connecting the AC drive circuit to the multiplier-rectifier circuit. To achieve good performance, it is common practice to operate the AC drive circuit at frequencies ranging from several kilohertz to several hundred kilohertz. It is also common practice to utilize interface transformers with large step-up turns ratios ranging from 10:1 to 1000:1, and multiplier-rectifier circuits comprising a number of cascade stages.

FIGS. 1A and 1B illustrate two known high voltage multiplier circuits. In each of these circuits an AC input signal on a line 20 is coupled to a multiplier-rectifier circuit, 22, 24, respectively, which provides an output signal that is proportional to the input AC voltage amplitude on the line 20 and the number of multiplying stages. To reduce size and cost, the multiplier-rectifier circuits 22, 24 typically include many stages and to use capacitors that have the lowest possible capacitance. However, as known, distributed stray shunt capacitance $C_s$ associated with the multiplier-rectifier portion of the power supply limits the performance of multiplier circuits, especially for multiplier circuits employing many stages and low values of coupling capacitance, $C_c$. Alternating currents flowing in the stray shunt capacitance, $C_s$, reduce the output voltage of stages furthest from the AC drive circuit (i.e., from the AC input signal on the line 20).

The undesirable effects of stray shunt capacitance $C_s$ can be partially overcome by installing a loading inductor, $L_T$, on the last stage as shown in FIGS. 2A and 2B. Additional loading inductors installed at intermediate locations along the multiplier circuit can further reduce the undesirable effects of stray capacitance. The performance benefits of using loading inductors are disclosed in the publication by E. Everhart, P. Lorain, entitled *The Cockcroft-Walton Voltage Multiplying Circuit*, published in the *Review of Scientific Instruments*, vol. 24, no. 3, p.221–226, (March 1953). The performance benefits include that the voltage distribution from stage-to-stage can be made substantially more uniform, and the stages furthest from the AC power source can contribute equally or even more than stages close to the AC source. However, the voltage distribution from stage-to-stage becomes dependent on the operating frequency of the AC drive circuit. As disclosed in the above identified publication by Everhart et al., an optimum voltage distribution is defined as one in which the voltage of the first and last multiplier stages, $V_1$ and $V_N$ respectively, have equal amplitudes. This optimum distribution is obtained when the AC power source is operated at an optimum frequency, $\omega_{opt}$, which depends on the stray capacitance, the coupling capacitance and the loading inductance.

The use of the loading inductors also causes the input impedance of the multiplier-rectifier circuit, $Z_m$, to become strongly dependent on frequency. With the addition of loading inductor $L_T$, the multiplier impedance, $Z_m$, exhibits resonant behavior. Below the resonance frequency value the reactive component of multiplier impedance $Z_m$ is inductive, and above resonance frequency value the reactive component of $Z_m$ is capacitive. The optimum voltage distribution as defined above is obtained at a frequency value above the resonant frequency value, and therefore multiplier impedance $Z_m$ has a capacitive reactance when $\omega=\omega_{opt}$. At resonance, the ratio of the top stage voltage to first stage voltage, $V_N/V_1$, achieves its maximum value, and $V_N/V_1>1$. As the drive frequency is increased above resonance, $V_N/V_1$, decreases monotonically and is equal to unity at $\omega=\omega_{opt}$. Therefore, to achieve good uniformity it is desirable to operate the multiplier-rectifier circuit in the frequency range, $\omega_{res}<\omega<\omega_{opt}$, which causes the multiplier impedance $Z_m$ to have a capacitive reactance.

The interface transformer between the AC drive and the multiplier-rectifier circuit further increases the capacitive load presented to the AC drive circuitry. Interwinding capacitance associated with the secondary winding contributes additional shunt capacitance seen by the AC drive circuit. The winding capacitance appears in parallel with the input terminals of the multiplier-rectifier circuit.

It is common practice in the design of high voltage power supplies to achieve efficient coupling by requiring that the AC drive circuit couple to a resonantly tuned circuit, in the case of the multiplier-rectifier circuit described herein, this has been accomplished by incorporating an additional parallel inductor, $L_{IN}$, at the input terminals of the multiplier-rectifier circuit, or an equivalent inductor in parallel with the primary winding of the transformer, as indicated in FIGS. 3A–3B, respectively. The inductor value is chosen so that the resonant frequency produced by the inductor and the equivalent capacitance, $C_{EQ}$, of the multiplier-rectifier circuit, $\omega=1/\sqrt{L_{IN}C_{EQ}}$ is equal to the desired operating frequency, for example $\omega=\omega_{opt}$. This approach has drawbacks, especially for commercial applications where ease of servicing and maintenance is important. The system is highly tuned requiring careful adjustment of the driver frequency to the resonant frequency. In addition, a frequency shift of the AC drive or the resonance of the multiplier-rectifier circuit can result from thermal and mechanical effects. Components and subsystems are difficult to replace without retuning of the power supply system. In addition, the input inductor, $L_{IN}$, is often a source of power loss because of the large circulating currents.

Therefore, there is a need for a high voltage power supply system that substantially overcomes the disadvantages of a resonantly tuned AC-drive circuit combined with a multiplier-rectifier circuit, to provide an AC drive circuit that couples power to a load that usually includes a substantial capacitive component.

SUMMARY OF THE INVENTION

An object of the present invention is to provide a high voltage power supply with substantially uniform voltage distribution along the multiplier-rectifier circuit.

Another object of the invention is to provide an efficient technique of driving a multiplier-rectifier circuit that utilizes at least one loading inductor.

Yet another object of the invention is to combine a high voltage multiplier-rectifier circuit utilizing a loading inductor, with an efficient non-resonant AC drive that drives the multiplier-rectifier circuit in the frequency range of $\omega_{res} < \omega < \omega_{opt}$.

Briefly, according to an aspect of the invention, a high voltage generator comprises a current source that provides a continuous current signal, which is converted to an alternating current signal by a switching circuit. A multiplier-rectifier circuit with, at least one loading inductor is responsive to the alternating current signal, and provides a rectified output voltage signal.

In a preferred high voltage generator, the input of the multiplier-rectifier circuit is briefly short circuited every half cycle of the alternating current signal during the transition from positive to negative current flow.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 12 is a list of typical values for the components illustrated in FIGS. 4A–11.

DETAILED DESCRIPTION OF THE INVENTION

Figure 1A:
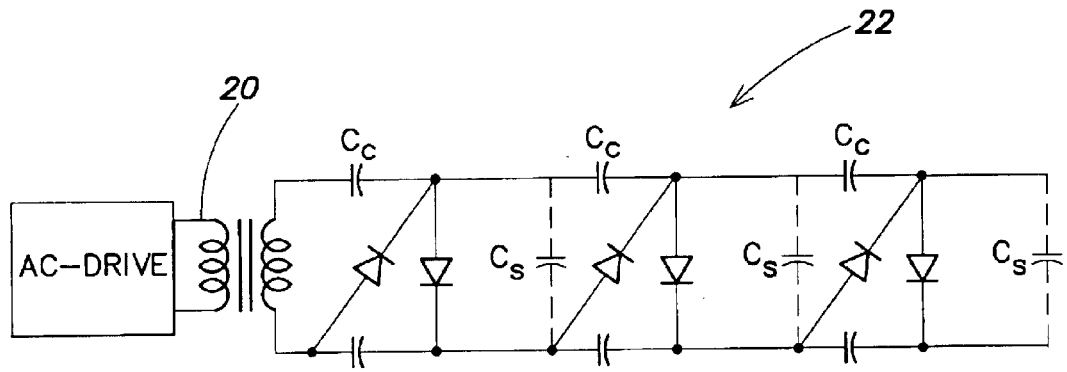
FIGS. 1A and 1B illustrate known high voltage multiplier circuits.
Figure 1B:
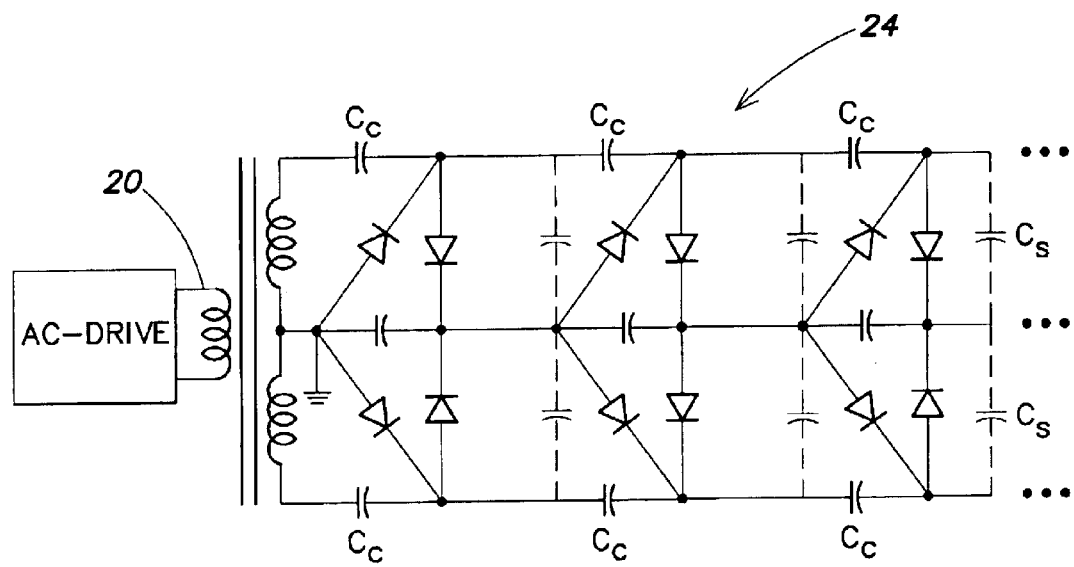
Figure 2A:
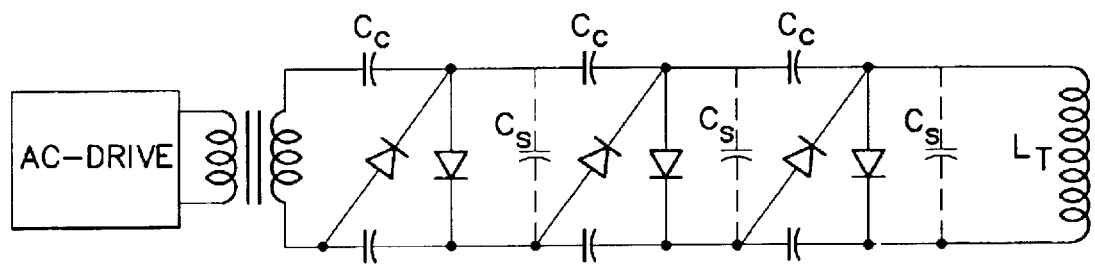
FIGS. 2A and 2B illustrate known high voltage multiplier circuits that each include a load inductor $L_T$ on their final output stage.
Figure 2B:
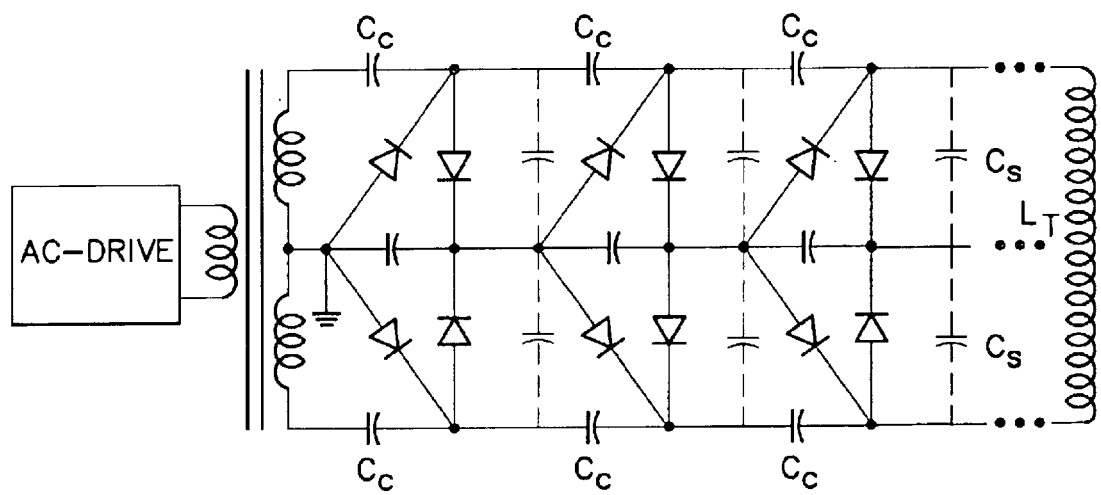
Figure 3A:
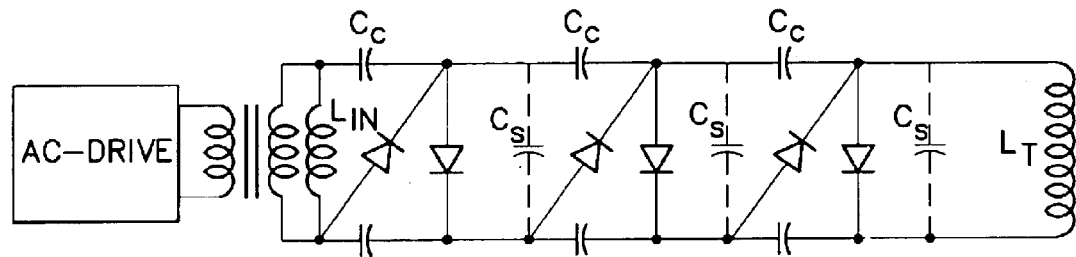
FIGS. 3A and 3B illustrate known high voltage multiplier circuits that each include a load inductor $L_{IN}$, to resonantly couple the AC-drive circuit to a multiplier-rectifier circuit.
Figure 3B:
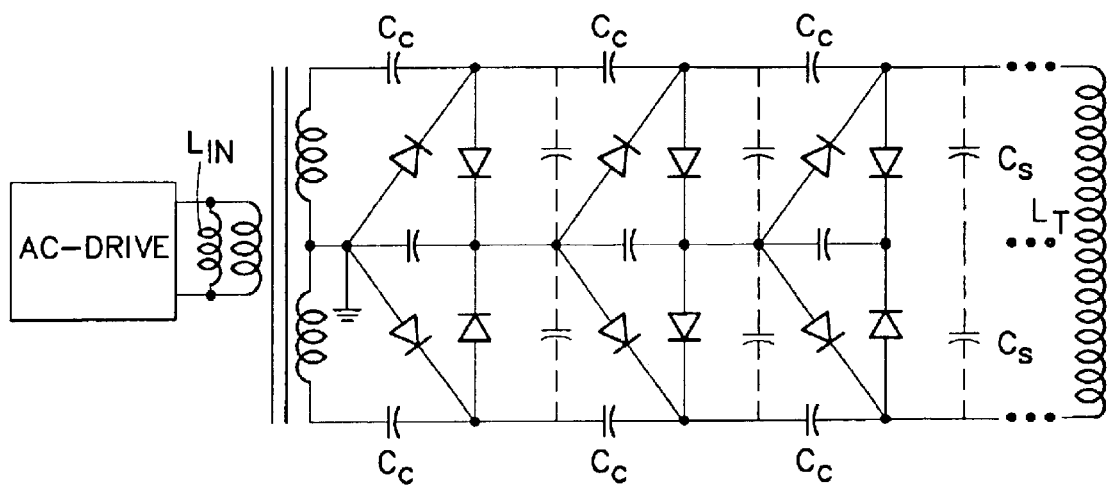
Figure 4A:
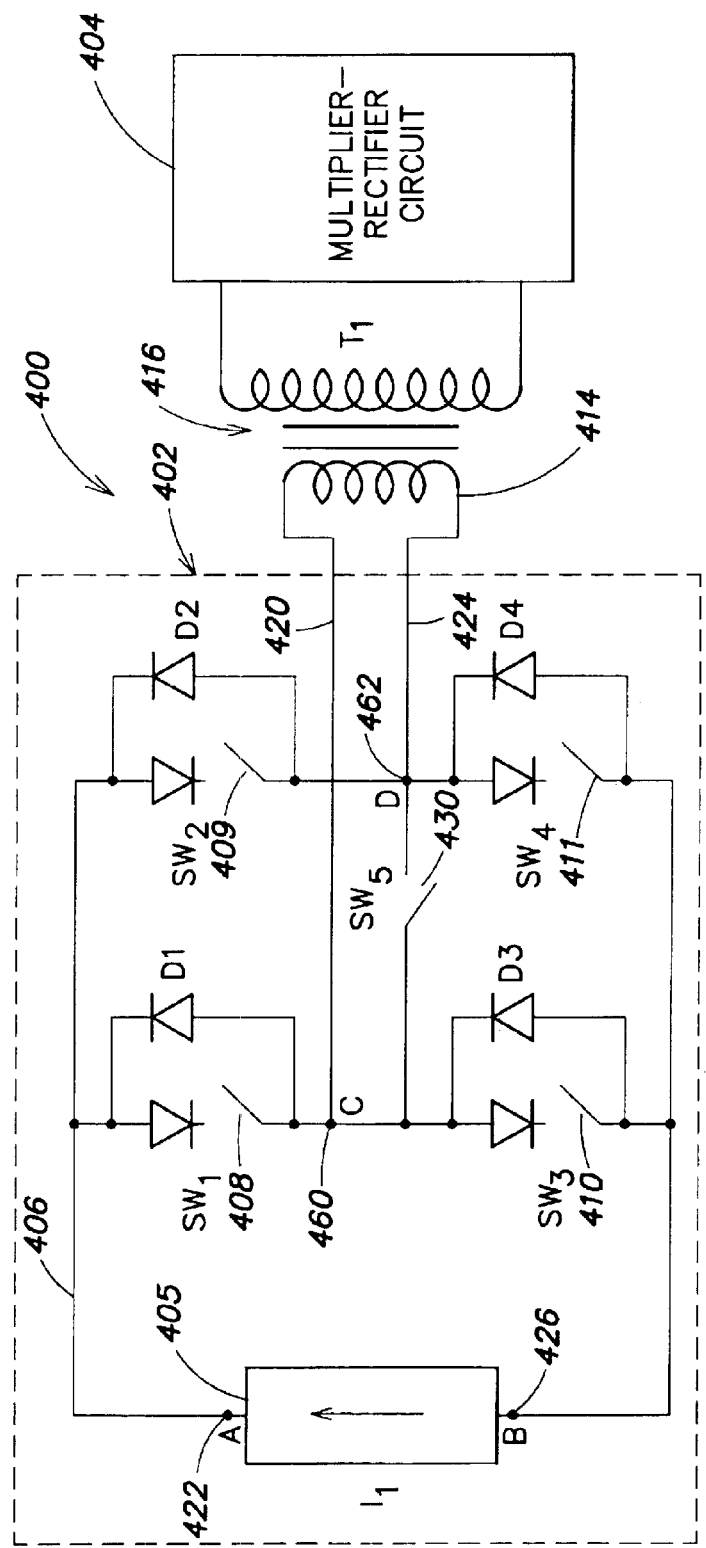
FIG. 4A illustrates a high voltage generator that includes an AC drive circuit configured and arranged to drive a multiplier rectifier circuit.

FIG. 4A illustrates a high voltage generator 400 that includes an AC drive circuit 402 configured and arranged to drive a multiplier-rectifier circuit 404. The AC drive circuit 402 includes an adjustable current source 405 that supplies current I on a line 406 to an H-bridge rectifying circuit that includes switches SW1, SW2, SW3, SW4, 408–411 respectively. The switches 408–411 may be any of the commonly used solid state switching devices such as bipolar junction transistors, insulated gate bipolar junction transistors, metal oxide silicon field effect transistors, or others. The H-bridge converts the continuous current from the current source 405 into an alternating current waveform, which is delivered to primary winding 414 of transformer 416. Switches SW1 408 and SW4 411 operate as a pair, and SW2 409 and SW3 410 operate as a pair. The two switch pairs alternately open and close, operating 180 degrees out of phase. When switches SW1 408, SW4 411 are closed, a first lead 420 of the primary winding 414 is connected to a first node 422 (node 3) of the current source 405 through switch SW1 408, and a second lead 424 of the primary winding 414 is connected to a second node 426 (node 4) of the current source 405 through switch SW4. When switches SW2 409, SW3 410 are closed, the first lead 420 of the primary winding 416 is connected to the second node 426 (node 4) of the current source, and the second lead 414 of the primary winding 416 is connected to the first node 422 of the current source 405.

Figure 4B:
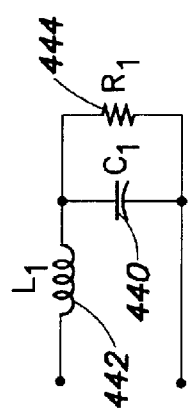
FIG. 4B is a schematic illustration of an equivalent circuit.

FIG. 4B is a schematic illustration of an equivalent RLC circuit of the transformer 416 and the voltage multiplier-rectifier circuit 404, representing the impedance in the frequency range of interest (i.e., $\omega_{res} > \omega > \omega_{opt}$). One of ordinary skill in the art recognize that the components illustrated in FIG. 4B are not actual physical components, but rather represent equivalent circuit values of the transformer 416 and multiplier-rectifier circuit 404. Capacitor $C_1$ 440 is the transformed impedance of the multiplier-rectifier circuit shown in FIG. 4A when operated at a frequency close to the optimum frequency, discussed above. Inductor $L_1$ 442 is the equivalent series load inductance including the leakage inductance of the transformer 416 (FIG. 4B), the inductance of interconnecting cables (now shown), and any additional lumped or distributed inductance between the AC drive circuit 402 and the multiplier-rectifier circuit 404. Resistor $R_1$ 444 is the resistive load transformed to the primary winding 414 (FIG. 4A).

A difficulty encountered when driving loads that have large capacitive reactances, are the high drive currents required to repetitively reverse the polarity of the load voltage. This is especially true at high frequency and for non-sinusoidal waveforms encountered with switching converters. These high currents in combination with phase shifted voltage and current waveforms place demands on the output switching devices, and result in power losses. The drive circuit shown in FIG. 4A overcomes these difficulties by incorporation of a shorting switch, SW5 430.

Figure 5A:
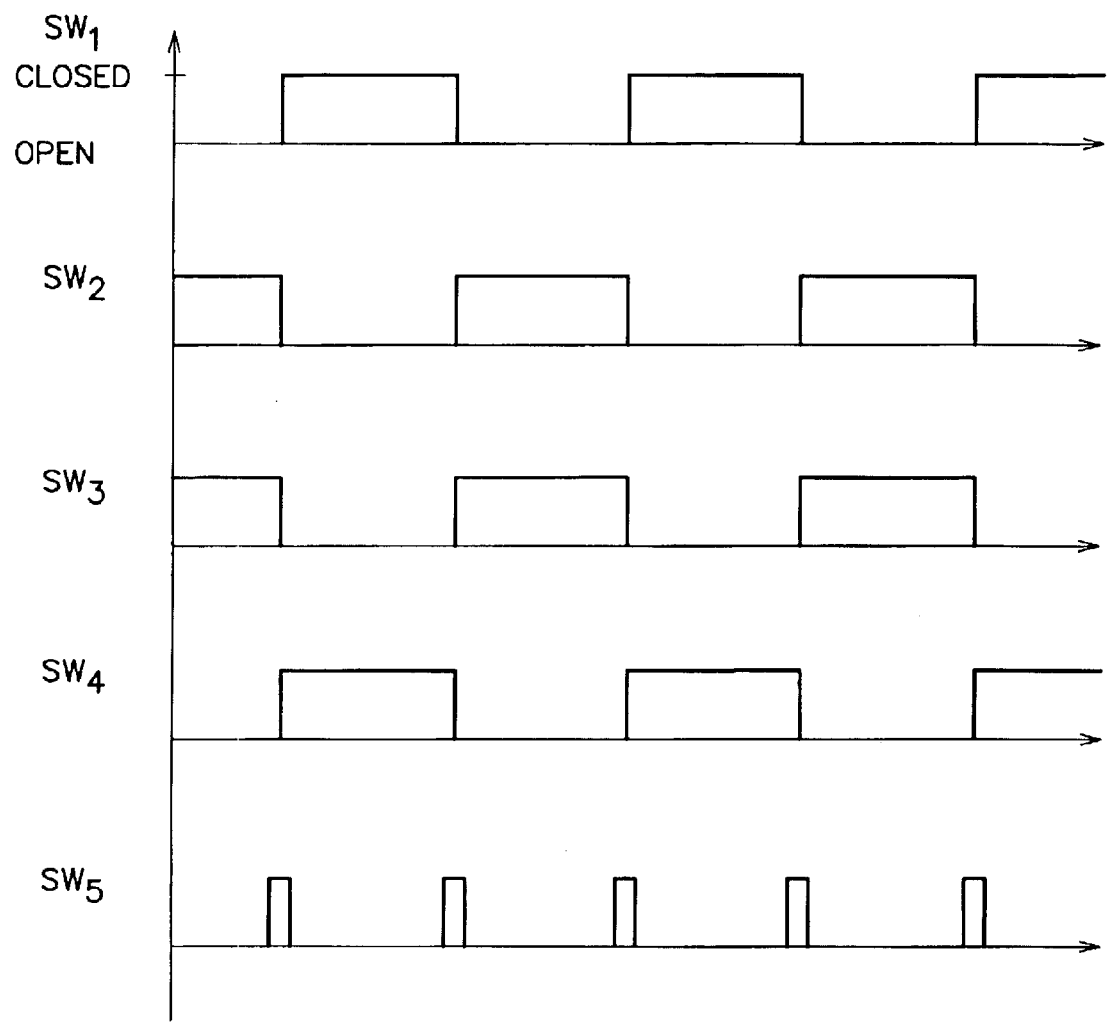
FIG. 5A is a plot of the position of the switches SW1, SW2, SW3, SW4 and SW5 (FIG. 4A) as a function of time for the operation of the drive circuit of FIG. 4A.
Figure 5B:
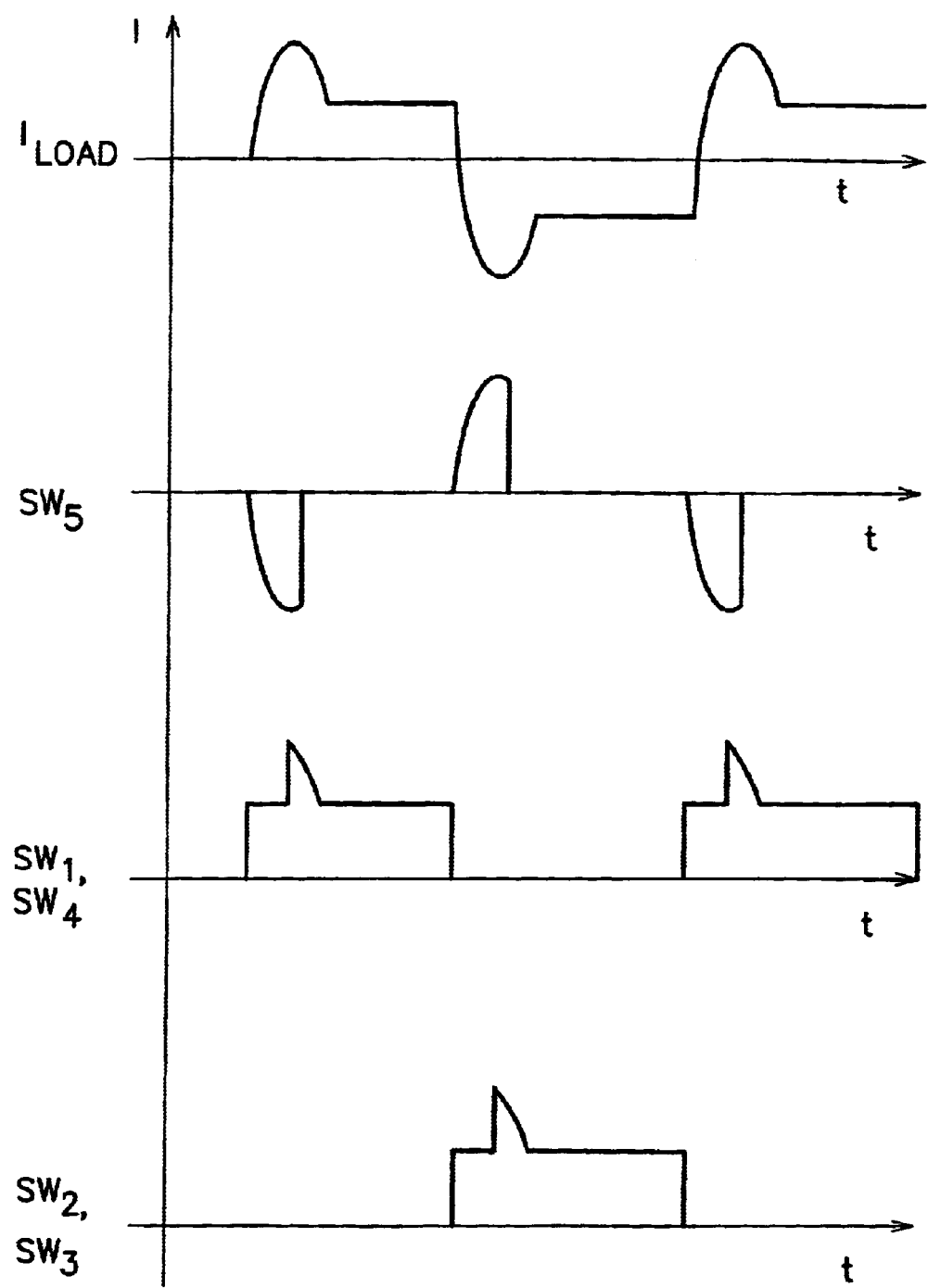
FIG. 5B is a plot of the resulting load current waveform and load voltage waveform V5–V6 when the switches are operated according to the timing illustrated in FIG. 5A.

FIG. 5A is a plot of the position of the switches SW1, SW2, SW3, SW4 and SW5 (FIG. 4A) as a function of time for the operation of the drive circuit of FIG. 4A. FIG. 5B is a plot of the resulting load current waveform and load voltage waveform V5–V6. Referring to FIGS. 4A, 5A, and 5B, the switches SW1–SW4 (FIG. 4A) operate as an H-bridge circuit alternately reversing the direction of current flow through the load. The switch SW5 430 (FIG. 4A) conducts for a short period of time during the transition from the switch pair SW1, SW4 to the switch pair SW2, SW3. The switch SW5 430 is closed for a sufficient time period to cause current reversal to take place in the transformer 416. This relies on the resonant interaction of equivalent components $L_1$ and $C_1$ shown in the RLC equivalent circuit of FIG. 4B. The switch SW5 must not remain closed for too long a time period to allow oscillation of the load current. Preferably, the switch SW5 430 remains closed for a time period approximately equal to one quarter of the oscillation period, $T_{SW5} \approx (2/\pi)\sqrt{L_1 C_1}$.

Figure 5C:
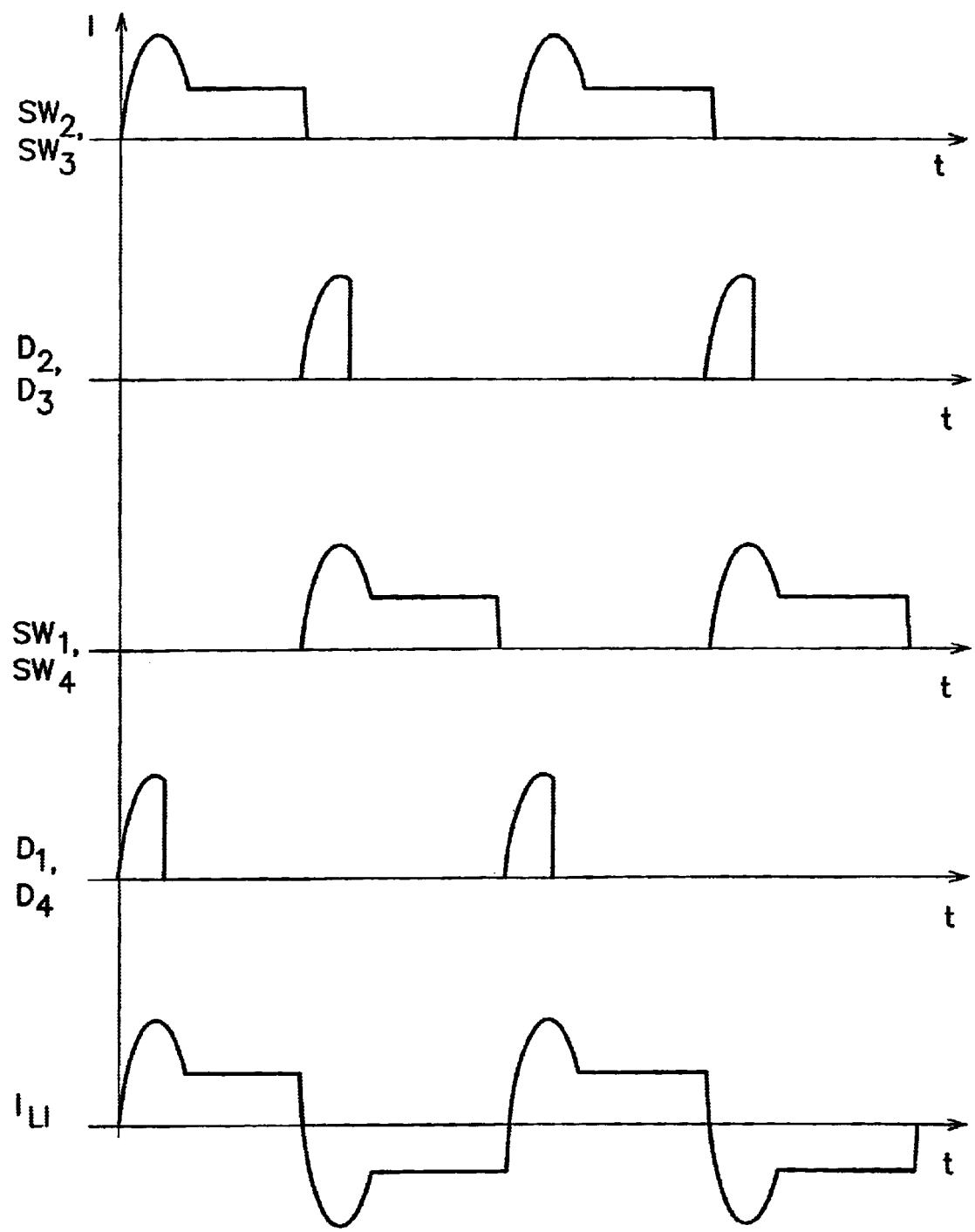
FIG. 5C is a plot of the current waveforms for the circuits illustrated in FIG. 4A and FIG. 7.

Referring again to FIG. 4A, notably the H-bridge is driven with a current source 405 rather than the common practice of using a voltage source. During the time period when the load shorting switch SW5 430 is closed, the voltage between nodes 422, 426 is about zero (i.e., V7–V8 ≈0), and a continuous current flows through the H-bridge switches. The current source 405 does not deliver power to the circuit during this time period, except for the power produced by the small voltage drop present in non-ideal switches. The current source 405 is not called upon to provide or store energy for the purpose of reversing the output polarity of the AC-drive circuit 402. Energy stored in the equivalent load capacitance $C_1$, as shown for convenience in FIG. 4B, during the positive (or negative) polarity of the waveform is recovered and used to reverse the polarity of the load current and voltage. An additional benefit of using a current source 405 to drive the H-bridge is the inherent protection afforded to the H-bridge switches SW1–SW4. If unintended switching of the switching devices or accidental shorting of output node 5 460 and output node 6 462 takes place, the current flowing in the switching devices is limited by the current from the current source 405. This is in contrast with a voltage driven H-bridge where either of these fault conditions inevitably results in failure of one of the switching devices. FIG. 5C is a plot of the current waveforms for the circuits illustrated in FIG. 4A and FIG. 7.

Figure 6:
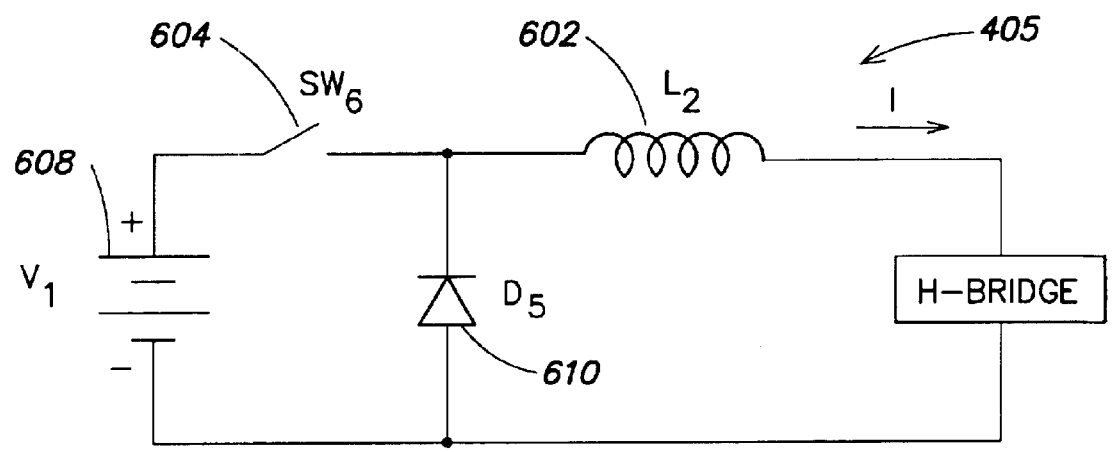
FIG. 6 illustrates an embodiment of the current source illustrated in FIG. 4A.

FIG. 6 illustrates an embodiment of the current source 405, employing a forward converter current source. Although this is not an ideal current source, it provides the benefits discussed above. Current flow is maintained at a relatively constant value with the use of a series inductor L2 602. The operation of this circuit is well known. Switch SW6 604 alternately opens and closes injecting current into inductor L2 602. During the time period when the switch SW6 604 is closed, the inductor L2 602 is connected to voltage source V1 608, and the current in the inductor L2 602 increases at a rate $dI_{L2}/dt=V_{L2}/L_2$. While the switch SW6 604 is open, the continuous current of the inductor L2 602 flows through free wheeling diode D5 610. The rate of rise in the current delivered to the H-bridge during the time period when the switch SW5 is closed depends on the value of inductance L2 602 and the relative timing of the switch SW6 604.

Figure 7:
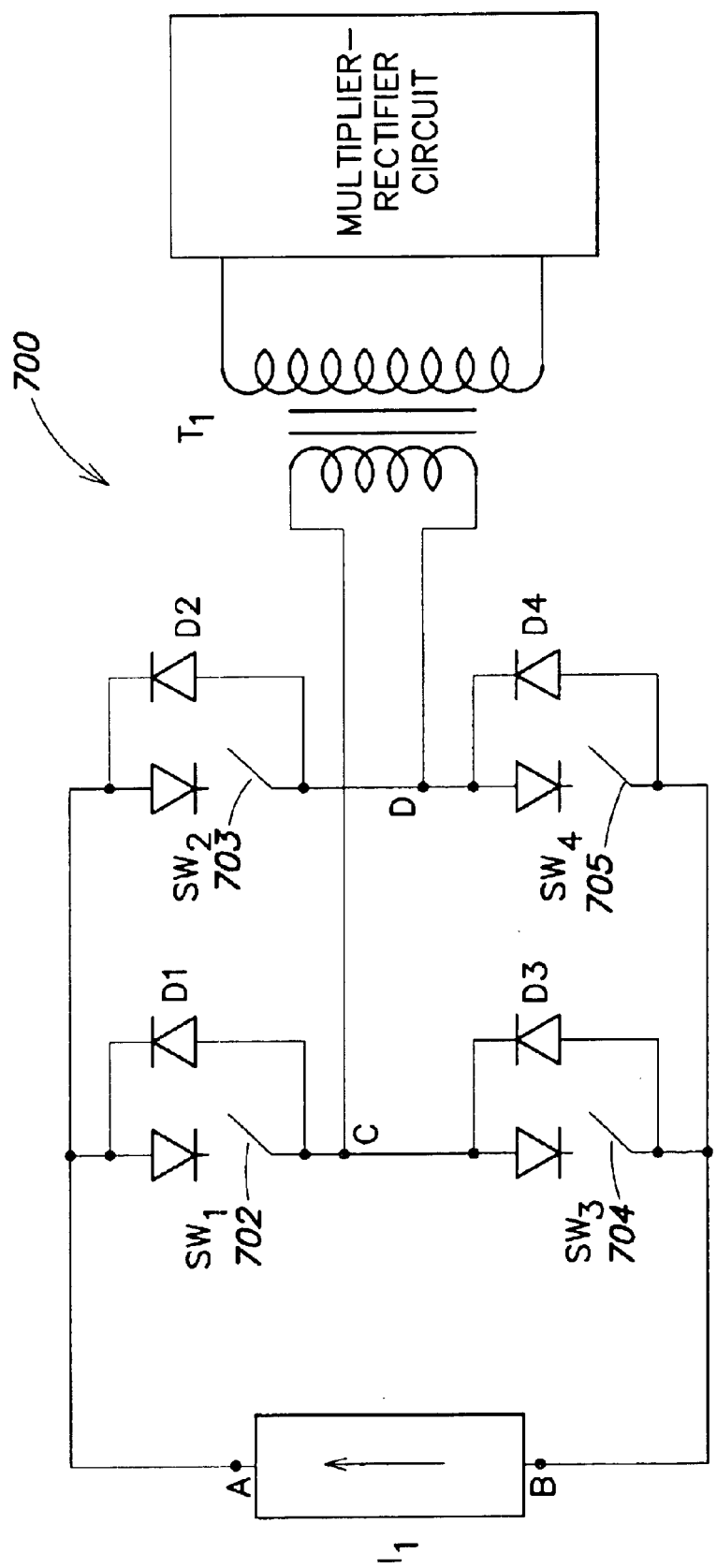
FIG. 7 illustrates an alternative embodiment high voltage generator that includes an AC drive circuit configured and arranged to drive a multiplier rectifier circuit.

FIG. 7 illustrates an alternative embodiment high voltage generator 700 that includes an AC drive circuit configured and arranged to drive a multiplier rectifier circuit. This high voltage generator 700 is substantially the same as the high voltage generator illustrated in FIG. 4A, with the principal exception that the voltage generator does not include a shorting switch SW5. Specifically, the high voltage generator 700 does not use the switch SW5 430 (FIG. 4A) to momentarily short the output nodes 5 and 6 of the H-bridge.

Figure 8:
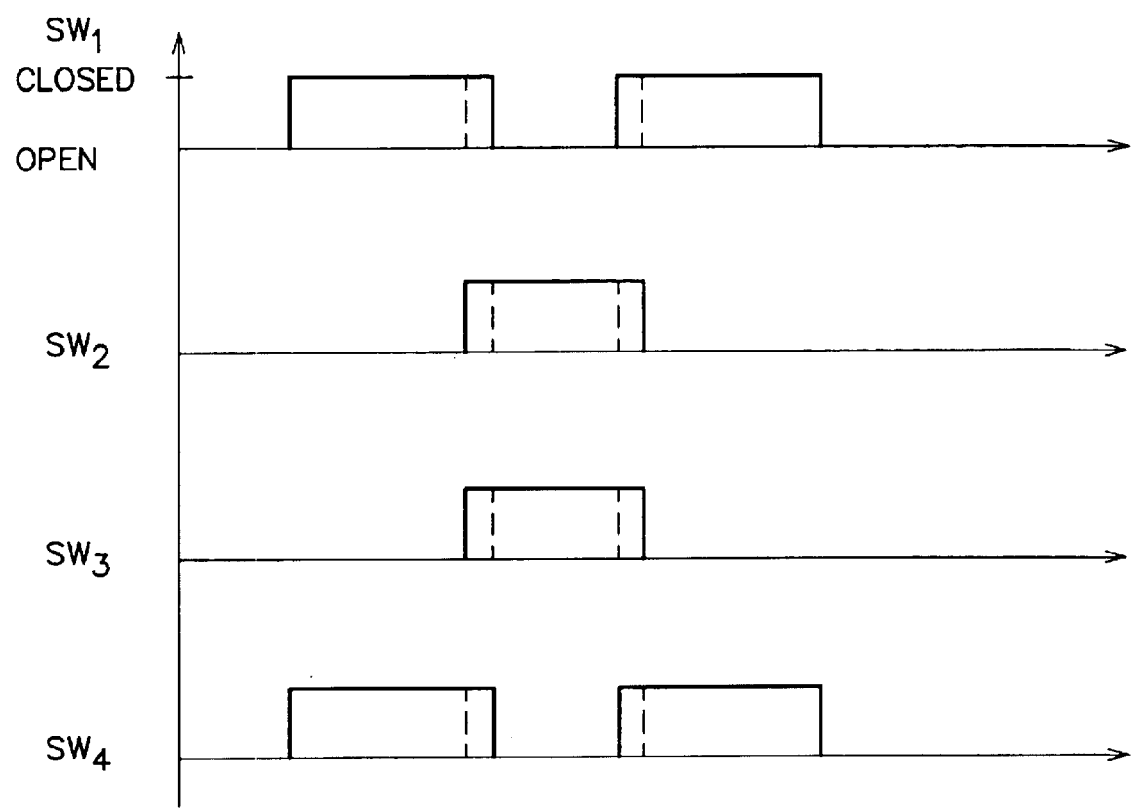
FIG. 8 is a plot of switch positions for switches SW1–SW4 illustrated in FIG. 7 as a function of time.

FIG. 8 is a plot of switch positions for switches SW1–SW4 702–705 (FIG. 7), respectively illustrated in FIG. 7. Significantly, output shorting is accomplished by causing the two switch pairs SW1, SW4 and SW2, SW3 to be simultaneously closed for a short time period during polarity reversal of the waveform, thus performing the same function as switch SW5 430 (FIG. 4A).

The inventive high voltage power supply incorporates the AC-drive circuit depicted in FIG. 4A with various multiplier-rectifier circuits to provide an efficient high voltage generator. In particular, multiplier-rectifier circuits which have been optimized for voltage uniformity by utilizing one or more loading inductors, are well suited for the inventive generator. These multiplier-rectifier circuits, as well as others, exhibit an input impedance that is substantially capacitive. This is especially true for multiplier-rectifier circuits that have been optimized for voltage uniformity, minimum stored energy, or highest average voltage per cascade stage. When combined with the AC-drive circuit of FIG. 4A, the resulting high voltage generator obviates the need for resonantly tuning the AC-drive circuit to the multiplier-rectifier circuit. The performance and efficiency of the high voltage generator is relatively insensitive to the operating frequency. In addition, individual components or subassemblies can be replaced or interchanged without the need for retuning the power supply system.

Figure 9:
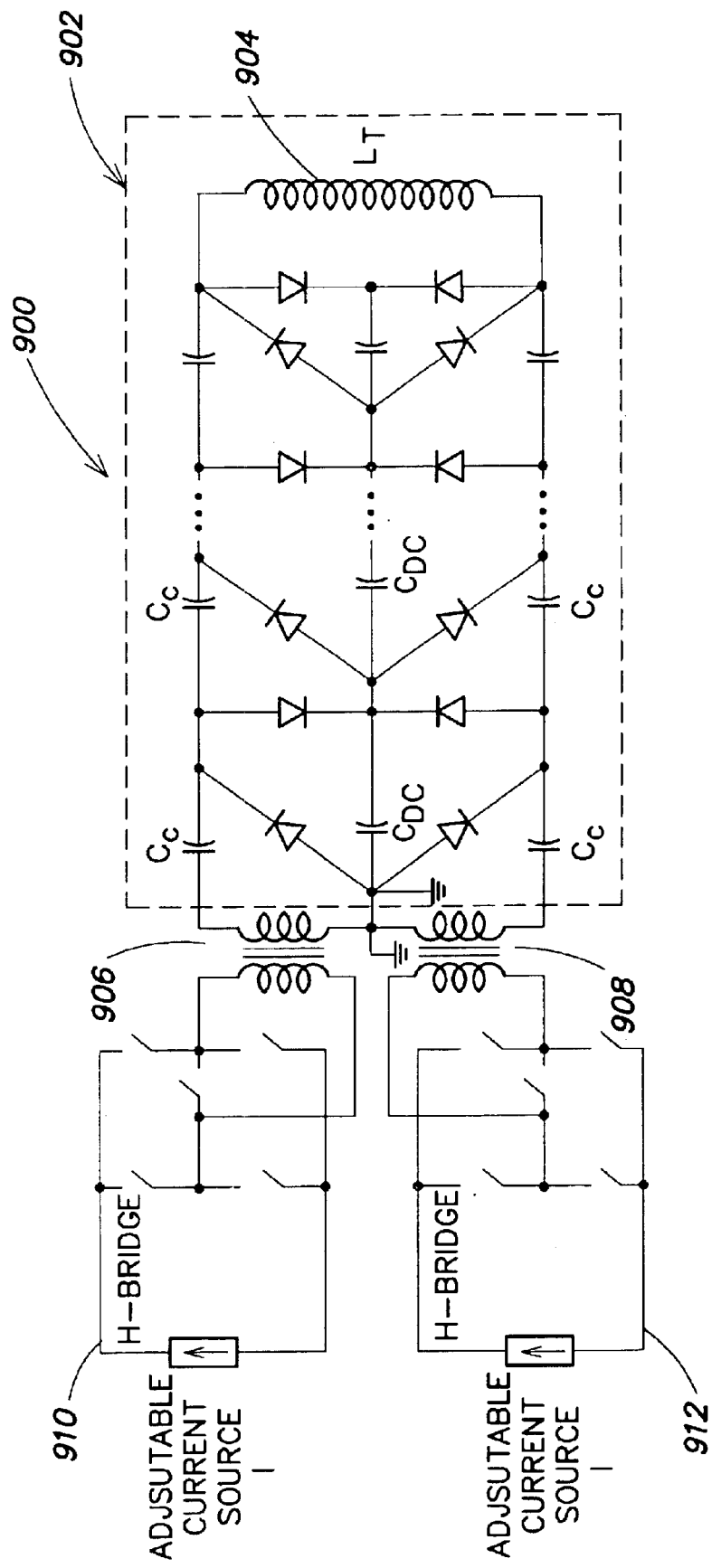
FIG. 9 is a schematic illustration of a symmetrical cascade multiplier with two independently adjustable AC-drive circuits.

FIG. 9 depicts another embodiment of a high voltage generator 900. The voltage generator 900 includes a symmetrical multiplier-rectifier circuit 902 utilizing a loading inductor 904, two interface transformers 906, 908, and two current driven H-bridge AC-drive circuits 910, 912. The AC-drive circuits are operated 180 degrees out of phase, and individually provide power to the two symmetrical legs of the multiplier-rectifier circuit. The amplitude of the two AC-drive circuits may be individually adjusted to obtain optimum balance in the multiplier-rectifier circuit. Balance is achieved when minimum voltage ripple on the high voltage terminal of the generator is attained. The balance adjustment allows for compensation of variations in component values, tolerances and mechanical assembly.

Figure 10:
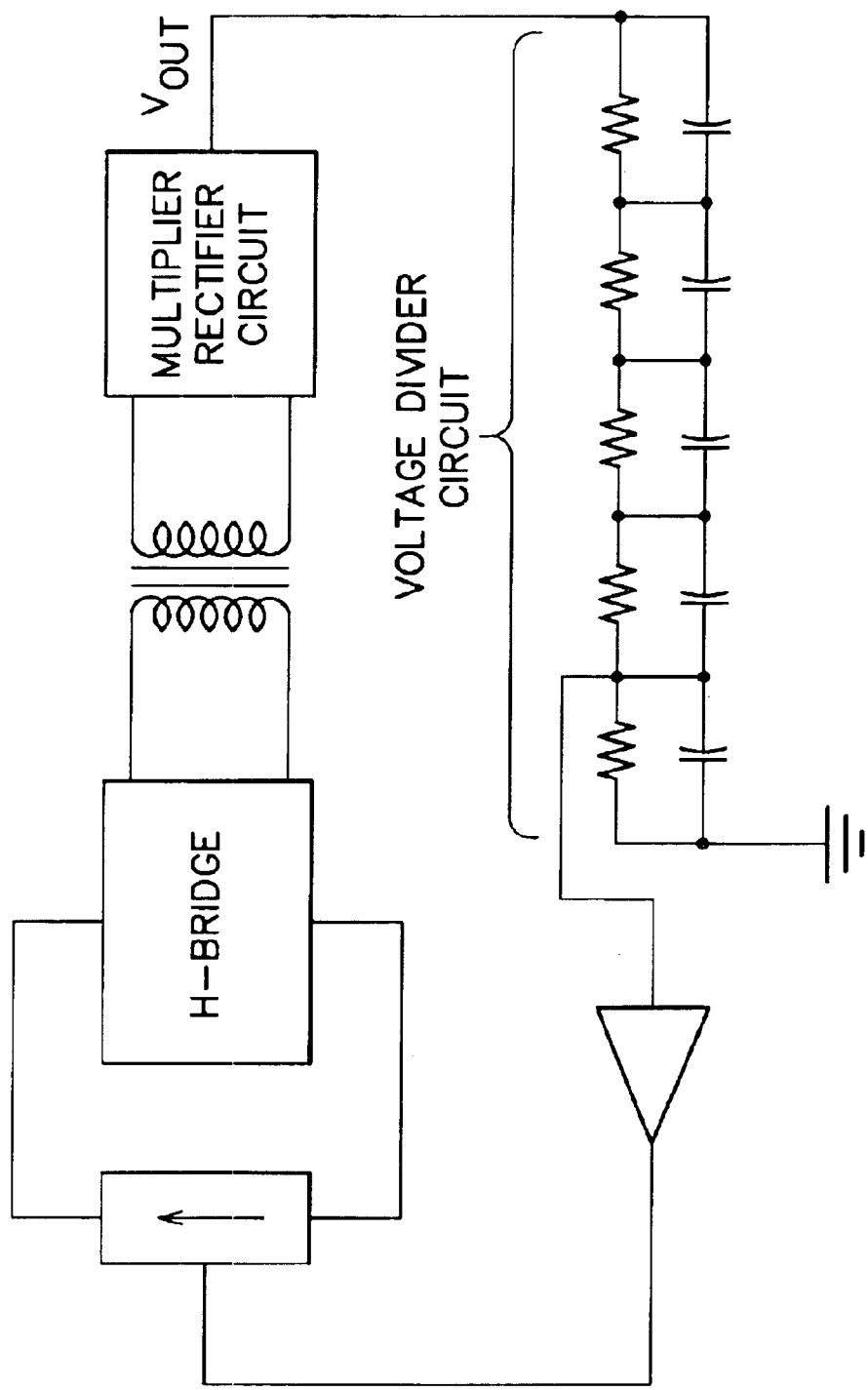
FIG. 10 illustrates a high voltage generator that includes feedback utilizing a voltage divider network.

In the inventive high voltage generator, the DC output voltage amplitude of the generator is controlled by adjusting the amplitude of the steady state current source of the AC-drive circuit. Stabilization of the high voltage output may be accomplished by the use of feedback. Compensation for variations in high voltage output is accomplished by changing the output of the AC-drive in response to variations in high voltage output. The high voltage output may be monitored using a voltage divider network that includes resistors or resistor and capacitors. The measured voltage in combination with a feedback amplifier and compensation circuit is used to adjust the amplitude of the current from the current source to compensate for variations in output voltage, as illustrated in FIG. 10.

Figure 11:
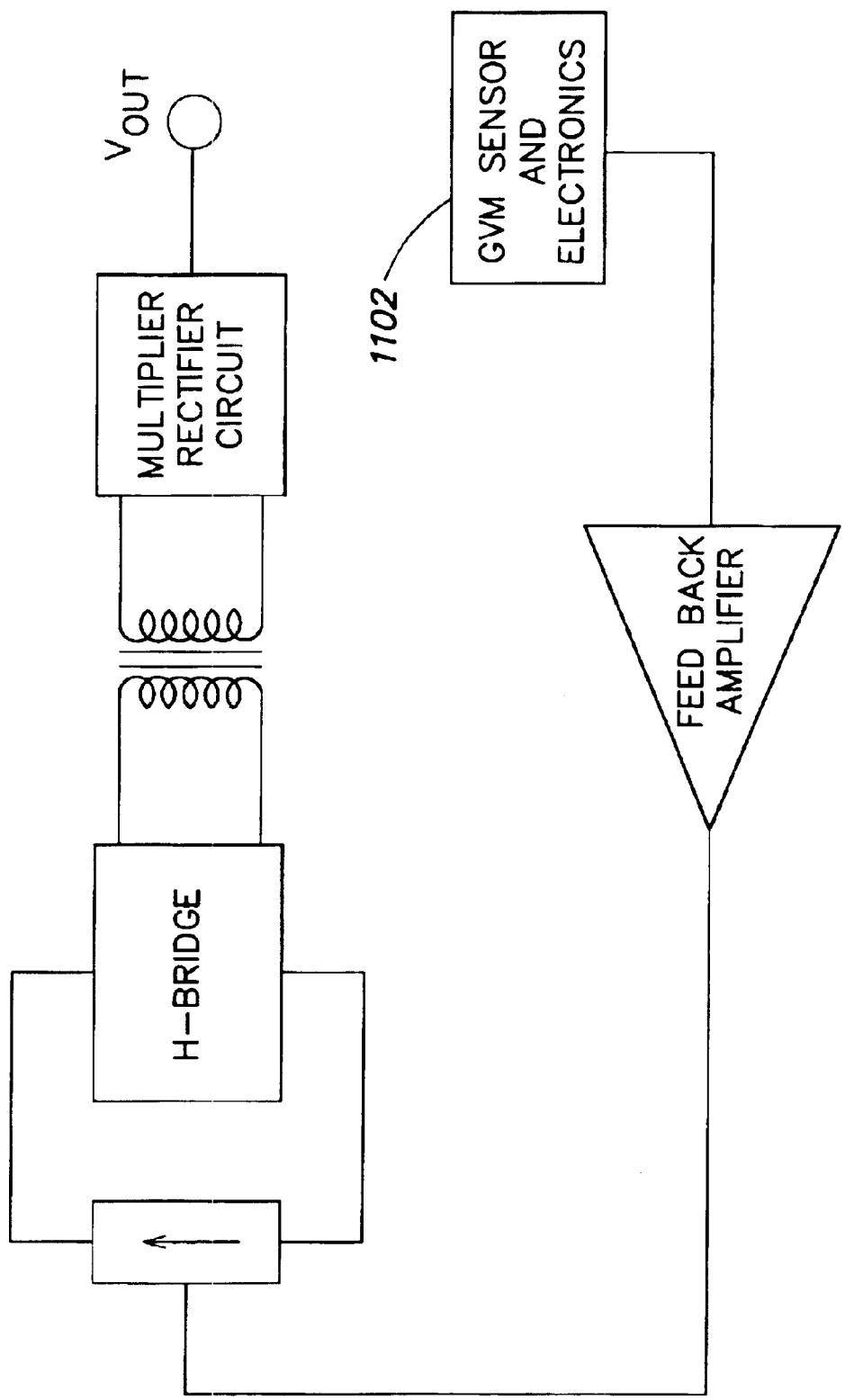
FIG. 11 illustrates high voltage generator that includes feedback utilizing a generating voltmeter.

Referring to FIG. 11, feedback stabilization may also be accomplished by measuring the high voltage output with a generating voltmeter (GVM) 1102. The GVM 1102 may be a rotating vane GVM, or a vibrating capacitor GVM. Using a GVM for feedback stabilization has several advantages when compared to the high voltage divider technique. The GVM is a non-contacting measurement technique and does not draw current from the high voltage generator. In addition, the GVM is less susceptible to inaccuracies due to thermal and voltage coefficient effects, and the GVM exhibits relatively fast response times. Furthermore, the GVM is usually less affected by stray current paths such as corona and stray capacitance.

FIG. 12 is a list of typical values for the components illustrated in FIGS. 4A–11.

A preferred embodiment of the inventive high voltage generator incorporates feedback stabilization preferably using a GVM voltage measuring technique.

Although the present invention has been shown and described with respect to several preferred embodiments thereof, various changes, omissions and additions to the form and detail thereof, may be made therein, without departing from the spirit and scope of the invention.

What is claimed is:

1. A high voltage power supply, comprising:
   a current source that provides a continuous current signal that is substantially independent of a voltage across load coupled to said current source;
   a switching circuit that includes a plurality of switching elements and is responsive to said continuous current signal, to provide an alternating current signal; and
   a multiplier-rectifier circuit with at least one loading inductor, and having an input responsive to said alternating current signal to provide a rectified output signal.

2. The high voltage power supply of claim 1, comprising:
   means for short-circuiting the input of said multiplier-rectifier circuit every half cycle of said alternating current signal causing polarity reversal of current flow.

3. The high voltage power supply of claim 2, wherein said means for short-circuiting the input of said multiplier-rectifier circuit comprises a switch connected across the input to said multiplier-rectifier circuit.

4. The high voltage power supply of claim 2, wherein said switching circuit comprises an H-bridge circuit.

5. The high voltage power supply of claim 4, wherein said means for short-circuiting the input to said multiplier-rectifier circuit includes simultaneously closing more than two switches of said H-bridge that are connected to the same side of said continuous current source.

6. The high voltage power supply of claim 4, wherein said means for short-circuiting the input to said multiplier-rectifier circuit includes simultaneously closing switches of all four legs of said H-bridge circuit.

7. The high voltage power supply of claim 1, wherein said continuous current source comprises a forward converter current source.

8. The high voltage power supply of claim 1, wherein said multiplier-rectifier circuit comprises a single-phase cascade generator.

9. The high voltage power supply of claim 1, wherein said multiplier-rectifier circuit comprises a symmetrical cascade generator.

10. A high voltage power supply, comprising:
    a symmetric cascade generator high voltage multiplier-rectifier circuit having at least one loading inductor;
    a first adjustable continuous current source that provides a first continuous current signal that is substantially independent of a first load coupled to said first adjustable continuous current source;
    a second a adjustable continuous current source that provide a second continuous current signal that is substantially independent of a second load coupled to said second adjustable continuous current source;
    means for converting said first and second continuous current signals to first and second alternating current signals; and
    means for connecting said first and second alternating current signals to first and second inputs respectively of said high voltage multiplier-rectifier circuit.

11. The high voltage power supply of claim 10, comprising:
    means for short-circuiting the input of each phase of said high voltage multiplier-rectifier circuit every half cycle of each alternating current waveform causing polarity reversal of current flow.

12. The high voltage power supply of claim 10, comprising:
    a switch responsive to a command signal, for short-circuiting the input of said high voltage multiplier-rectifier circuit every half cycle of each alternating current waveform causing polarity reversal of current flow.

13. The high voltage power supply of claim 10, wherein the amplitudes of said first and second continuous current signals are independently adjusted to reduce voltage ripple on the high voltage output of said multiplier-rectifier circuit.

14. The high voltage power supply of claim 10, further comprising means for providing feedback stabilization of the output voltage of said high voltage multiplier-rectifier circuit.

15. The high voltage power supply of claim 14, wherein said means for providing feedback stabilization includes a voltage divider circuit connected between the high voltage terminal and ground to adjust the amplitude of said first and second continuous current signals.

16. The high voltage power supply of claim 14, wherein the means for providing feedback stabilization includes a generating voltmeter that measures the voltage at the high voltage terminal to adjust the amplitude of said first and second continuous current signals.

17. A high voltage power supply, comprising:
    a power source that provides a continuous power signal;
    a switch circuit that receives said continuous power signal and provides an alternating current signal;
    a multiplier-rectifier circuit that includes at least one loading inductor, and an input that is responsive to said alternating current signal to provide a rectified output signal;
    reversing means for causing a short-circuit at said input of said multiplier-rectifier circuit twice per cycle of said alternating current signal, said short-circuit causing polarity reversal of alternating current flow within said multiplier-rectifier circuit from a first polarity to a second polarity; and
    driving means for opening said short-circuit sufficiently soon after causing the short-circuit that the multiplier-rectifier circuit may be driven by said alternating current signal at the second polarity.

18. The high voltage power supply of claim 17, wherein said reversing means comprises at least one switching element in the switch circuit that is opened and closed in a controlled manner to short circuit said input of said multiplier-rectifier circuit.

19. A high voltage power supply, comprising:
    a power source that provides a continuous power signal;
    a switching circuit that includes more than two switching elements and is responsive to said continuous power signal, to provide an alternating current signal;
    a multiplier-rectifier circuit that includes at least one loading inductor, having an input that is responsive to said alternating current signal, and provides a rectified output signal;
    wherein said more than two switching elements are all briefly closed twice per cycle of said alternating current signal causing polarity reversal of current flow in said multiplier-rectifier circuit.

20. The high voltage power supply of claim 19, wherein said more than two switching elements are closed for approximately one quarter of the oscillation period.

21. A high voltage power supply, comprising:

a power source that provides a continuous power signal;

means responsive to said continuous power signal, for providing an alternating current signal; and a multiplier-rectifier circuit with at least one loading inductor, and having an inherent capacitance at high frequencies and an input for receiving said alternating current signal, said multiplier-rectifier circuit providing a rectified output signal responsive to said alternating current signal such that each reversal of said alternating current signal within said multiplier-rectifier circuit is caused, at least in part, by discharging a potential stored in the inherent capacitance of the multiplier-rectifier circuit.

22. A high voltage power supply, comprising:

a current source that provides a continuous current signal at an output of the current source that is substantially independent of a voltage across the output of the current source;

converter means responsive to said continuous current signal, for providing an alternating current signal; and a multiplier-rectifier circuit with at least one loading inductor, and having an input for receiving said alternating current signal, said multiplier-rectifier circuit providing a rectified output signal responsive to said alternating current signal;

wherein said converter means for providing said alternating current signal comprises short-circuiting means for reversing the polarity of alternating current flow in said multiplier-rectifier circuit twice per cycle of said alternating current signal.

23. A high voltage power supply as claimed in claim 22, wherein said short-circuiting means includes four switches that are employed to provide the alternating current signal.

24. A high voltage power supply as claimed in claim 22, wherein said short-circuiting means includes a switch that is employed to provide a short circuit across a primary winding of a transformer that couples the alternating current signal to the multiplier-rectifier circuit.

25. A method of providing a high voltage, said method comprising the steps of:

providing an alternating current signal to an input of a multiplier-rectifier circuit;

driving the multiplier-rectifier circuit with an alternating current signal at a first polarity causing the multiplier-rectifier circuit to store charge having a first polarity responsive to the input alternating current signal having the first polarity;

short-circuiting the input to the multiplier rectifier circuit to reverse the polarity of alternating current flow in the multiplier-rectifier circuit from the first polarity to a second polarity; and driving them multiplier-rectifier circuit with the alternating current voltage signal at the second polarity causing the multiplier-rectifier circuit to store charge having the second polarity responsive to the input alternating current signal having the second polarity.

26. The method as claimed in claim 25, wherein said step of providing an alternating current signal includes the step of providing a current source that provides a continuous current signal that is substantially independent of a voltage across a load coupled to said current source.

27. The method as claimed in claim 25, wherein said step of providing an alternating current signal includes the step of employing a plurality of switches to convert a DC power signal to the alternating current signal, and wherein said step of reversing the polarity of alternating current flow in the multiplier-rectifier circuit includes closing each of said plurality of switches at the same time.

\* \* \* \* \*

UNITED STATES PATENT AND TRADEMARK OFFICE
CERTIFICATE OF CORRECTION

PATENT NO. : 6,927,985 B2
DATED : August 9, 2005
INVENTOR(S) : Klinkowstein

It is certified that error appears in the above-identified patent and that said Letters Patent is hereby corrected as shown below:

Column 7,
Line 45, please delete "symmetric" and replace with -- symmetrical --.

Column 10,
Line 18, please delete "them" and replace with -- the --.

Signed and Sealed this

Fourth Day of October, 2005

JON W. DUDAS
*Director of the United States Patent and Trademark Office*

UNITED STATES PATENT AND TRADEMARK OFFICE
CERTIFICATE OF CORRECTION

PATENT NO.    : 6,927,985 B2
DATED         : August 9, 2005
INVENTOR(S)   : Klinkowstein It is certified that error appears in the above-identified patent and that said Letters Patent is hereby corrected as shown below:

Column 7,
Line 7, delete "loaded coupled" and replace with -- a loaded coupled --.

Signed and Sealed this

Twenty-fourth Day of January, 2006

JON W. DUDAS
*Director of the United States Patent and Trademark Office*